(12) United States Patent
Choi

(10) Patent No.: US 10,921,998 B2
(45) Date of Patent: Feb. 16, 2021

(54) MEMORY SYSTEM AND OPERATING METHOD THEREOF

(71) Applicant: SK hynix Inc., Gyeonggi-do (KR)

(72) Inventor: Hae-Gi Choi, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/375,975

(22) Filed: Apr. 5, 2019

(65) Prior Publication Data

US 2020/0019327 A1    Jan. 16, 2020

(30) Foreign Application Priority Data

Jul. 13, 2018  (KR) ......................... 10-2018-0081882

(51) Int. Cl.
*G06F 12/00* (2006.01)
*G06F 13/00* (2006.01)
*G06F 3/06* (2006.01)

(52) U.S. Cl.
CPC .......... *G06F 3/0631* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| 9,141,528 B2 | 9/2015 | Gorobets et al. | |
| 10,073,623 B2* | 9/2018 | You | G06F 13/18 |
| 2014/0115239 A1* | 4/2014 | Kong | G06F 12/0246 711/103 |
| 2015/0095546 A1* | 4/2015 | Bennett | G06F 12/0246 711/5 |
| 2016/0062885 A1* | 3/2016 | Ryu | G06F 12/0246 711/103 |
| 2019/0187900 A1* | 6/2019 | Byun | G06F 12/0246 |

FOREIGN PATENT DOCUMENTS

KR     10-2016-0112529     9/2016

* cited by examiner

*Primary Examiner* — Sean D Rossiter
(74) *Attorney, Agent, or Firm* — IP & T Group LLP

(57) ABSTRACT

A memory system may include: a nonvolatile memory device including a plurality of memory blocks each including a plurality of pages; and a controller suitable for: managing mapping information for mapping logical addresses to physical addresses; classifying, as a specific physical address, a physical address that becomes a target physical address of a remap command by exceeding a first threshold count; and classifying, as cold data, data stored in a specific page corresponding to the specific physical address among the pages, wherein, in response to the remap command, the controller further: detects the target physical address corresponding to a first logical address through the mapping information; and remaps the target physical address to a second logical address, and wherein the first threshold count is a natural number of 2 or more.

18 Claims, 13 Drawing Sheets

MEMORY SYSTEM AND OPERATING METHOD THEREOF

CROSS-REFERENCE TO RELATED APPLICATION

This application claims priority under 35 U.S.C. § 119 to Korean Patent Application No. 10-2018-0081882, filed on Jul. 13, 2018, which is incorporated herein by reference in its entirety.

BACKGROUND

1. Field

Various embodiments relate to a memory system and, more particularly, to a memory system including a nonvolatile memory device and an operating method thereof.

2. Discussion of the Related Art

The computer environment paradigm has changed to ubiquitous computing systems that can be used anytime and anywhere. Due to this fact, use of portable electronic devices such as mobile phones, digital cameras, and notebook computers has rapidly increased. These portable electronic devices generally use a memory system having one or more memory devices for storing data. A memory system may be used as a main memory device or an auxiliary memory device of a portable electronic device.

Memory systems provide excellent stability, durability, high information access speed, and low power consumption since they have no moving parts. Examples of memory systems having such advantages include universal serial bus (USB) memory devices, memory cards having various interfaces, and solid state drives (SSD).

SUMMARY

Various embodiments are directed to a memory system capable of effectively classifying the data stored therein depending on a remap command from a host, and an operating method thereof.

In an embodiment, a memory system may include: a nonvolatile memory device including a plurality of memory blocks each including a plurality of pages; and a controller suitable for: managing mapping information for mapping logical addresses to physical addresses; classifying, as a specific physical address, a physical address that becomes a target physical address of a remap command by exceeding a first threshold count; and classifying, as cold data, data stored in a specific page corresponding to the specific physical address among the pages. In response to the remap command, the controller may further: detect the target physical address corresponding to a first logical address through the mapping information; and remap the target physical address to a second logical address. The first threshold count may be a natural number of 2 or more.

After remapping the detected physical address to the second logical address, the controller may further increase a remap count of the target physical address.

After increasing the remap count of the target physical address, the controller may further detect whether the remap count of the target physical address exceeds the first threshold count, and the controller may classify the target physical address as the specific physical address when the remap count exceeds the first threshold count.

The controller may further initialize the remap count of the specific physical address according to the classification of the data.

The controller may further increase the remap count of the specific physical address whenever the specific physical address becomes the target physical address.

In response to a write command provided along with a write logical address and write data, the controller may further: detect a first physical address mapped to the write logical address in the mapping information; remap a second physical address to the write logical address; and store the write data in a page corresponding to the second physical address among the pages. The controller may do not classify the second physical address as the specific physical address when the first physical address has been classified as the specific physical address.

In response to a write command provided along with a write logical address and write data, the controller may further: detect a first physical address mapped to the write logical address in the mapping information; remap a second physical address to the write logical address; and store the write data in a page corresponding to the second physical address among the pages. When the first physical address has been classified as the specific physical address, the controller may further reduce the remap count of the first physical address and assigns the reduced value to the remap count of the second physical address.

The controller may further: check whether the remap count of the second physical address is less than a second threshold count; and do not classify the second physical address as the specific physical address when the remap count of the second physical address is less than the second threshold count. The second threshold count may be set to a natural number which is less than or equal to the first threshold count.

In the case where the number of specific pages in which cold data are stored, among entire pages included in the memory blocks, reaches a set number, the controller may further: move the cold data to a specific memory block among the memory blocks through a merge operation; and manage the specific memory block as a cold block.

The controller may further: select a memory block in which the number of invalid pages exceeds a set percentage among the memory blocks; move data classified as cold data among data stored in valid pages of the selected memory block, to a first memory block among the memory blocks through a merge operation; move data not classified as cold data to a second memory block among the memory blocks through the merge operation; manage the first memory block as a cold block; and manage the second memory block as a normal block or a hot block.

In an embodiment, a method for operating a memory system including a nonvolatile memory device which includes a plurality of memory blocks each including a plurality of pages, the method may include: managing mapping information for mapping logical addresses to physical addresses; classifying, as a specific physical address, a physical address which becomes a target physical address of a remap command by exceeding a first threshold count; and classifying, as cold data, data stored in a specific page corresponding to the specific physical address among the pages, the method may further include in response to the remap command: detecting the target physical address corresponding to a first logical address through the mapping information; and remapping the target physical address to a second logical address. The first threshold count may be a natural number of 2 or more.

The method may further include increasing, after the remapping of the target physical address, a remap count of the target physical address.

The method may further include detecting, after the increasing of the remap count, whether the remap count of the target physical address exceeds the first threshold count. The target physical address may be classified as the specific physical address in the case where the remap count exceeds the first threshold count.

The method may further include initializing the remap count of the specific physical address according to the classifying of the data.

The method may further include increasing the remap count of the specific physical address whenever the specific physical address becomes the target physical address.

The method may further include in response to a write command provided along with a write logical address and write data: detecting a first physical address mapped to the write logical address in the mapping information; remapping a second physical address to the write logical address; and storing the write data in a page corresponding to the second physical address among the pages. The second physical address may be not classified as the specific physical address when the first physical address has been classified as the specific physical address.

The method may further include in response to a write command provided along with a write logical address and write data: detecting a first physical address mapped to the write logical address in the mapping information; remapping a second physical address to the write logical address; and storing the write data in a page corresponding to the second physical address among the pages; and the method may further include when the first physical address has been classified as the specific physical address: reducing the remap count of the first physical address; and assigning the reduced value to the remap count of the second physical address.

The method may further include: checking whether the remap count of the second physical address is less than a second threshold count; and not classifying the second physical address as the specific physical address when the remap count of the second physical address is less than the second threshold count. The second threshold count may be set to a natural number which is less than or equal to the first threshold count.

The method may further include in the case where the number of specific pages in which cold data are stored reaches a set number among entire pages in the memory blocks: moving the cold data to a specific memory block among the memory blocks through a merge operation; and managing the specific memory block as a cold block.

The method may further include: selecting a memory block in which the number of invalid pages exceeds a set percentage among the memory blocks; moving data classified as cold data among data stored in valid pages of the selected memory block, to a first memory block among the memory blocks through a merge operation; moving data not classified as cold data to a second memory block among the memory blocks through the merge operation; managing the first memory block as a cold block; and managing the second memory block as a normal block or a hot block.

In an embodiment, a memory system may include: a memory device including a plurality of pages; and a controller suitable for: designating, as cold data, data stored in a page indicated by a physical address, which, as a result of satisfying a condition, becomes a target physical address of a remap operation of changing a logical address mapped thereto; and controlling the memory device to gather cold data stored in one or more of the pages into another page.

BRIEF DESCRIPTION OF THE DRAWINGS

These and other features and advantages of the present invention will become apparent to those skilled in the art to which the present invention pertains from the following detailed description in reference to the accompanying drawings, wherein.

DETAILED DESCRIPTION

Figure 1:
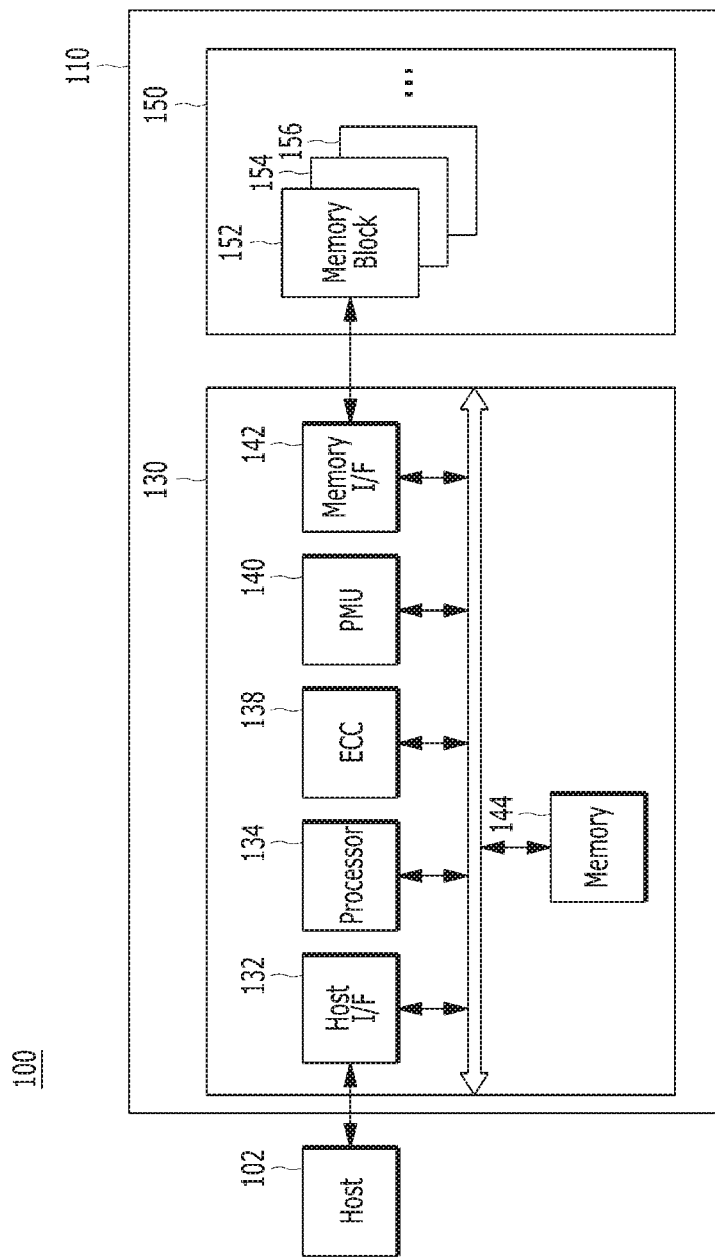
FIG. 1 is a block diagram illustrating a data processing system including a memory system in accordance with an embodiment of the present invention.

Various embodiments of the present invention are described below in more detail with reference to the accompanying drawings. The present invention, however, may be embodied in different other embodiments, forms and variations thereof and thus should not be construed as being limited to the embodiments set forth herein. Rather, the described embodiments are provided so that this disclosure is thorough and complete and fully conveys the present invention to those skilled in the art to which this invention pertains. Throughout the disclosure, like reference numerals refer to like parts throughout the various figures and embodiments of the present invention. Also, throughout the specification, reference to "an embodiment," "another embodiment" or the like is not necessarily to only one embodiment, and different references to any such phrase are not necessarily to the same embodiment(s).

It will be understood that, although the terms "first", "second", "third", and so on may be used herein to identify various elements, these elements are not limited by these terms. These terms are used to distinguish one element from another element that otherwise have the same or similar names. Thus, a first element in one instance could also be termed a second or third element in another instance without departing from the spirit and scope of the present invention.

The drawings are not necessarily to scale and, in some instances, proportions may have been exaggerated in order to clearly illustrate features of the embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present. Communication between two elements, whether directly or indirectly connected/coupled, may be wired or wireless, unless the context indicates otherwise.

The terminology used herein is for the purpose of describing particular embodiments only and is not intended to be limiting of the present invention. As used herein, singular forms are intended to include the plural forms and vice versa, unless the context clearly indicates otherwise. It will be further understood that the terms "comprises," "comprising," "includes," and "including" when used in this specification, specify the presence of the stated elements but do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

FIG. 1 is a block diagram illustrating a data processing system 100 including a memory system 110 in accordance with an embodiment of the present invention.

Referring to FIG. 1, the data processing system 100 may include a host 102 and the memory system 110.

The host 102 may include portable electronic devices such as a mobile phone, MP3 player and laptop computer or non-portable electronic devices such as a desktop computer, game machine, TV and projector.

The memory system 110 may operate to store data for the host 102 in response to a request of the host 102. Non-limiting examples of the memory system 110 include a solid state drive (SSD), a multi-media card (MMC), a secure digital (SD) card, a universal storage bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and/or micro-MMC. The SD card may include a mini-SD card and/or micro-SD card.

The memory system 110 may be embodied by various types of storage devices. Non-limiting examples of storage devices included in the memory system 110 include volatile memory devices such as a DRAM dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM) and a flash memory. The flash memory may have a 3-dimensional (3D) stack structure.

The memory system 110 may include a memory device 150 and a controller 130. The memory device 150 may store data for the host 120, and the controller 130 may control data storage into the memory device 150.

The controller 130 and the memory device 150 may be integrated into a single semiconductor device, which may be included in any of the various types of memory systems exemplified above.

Non-limiting application examples of the memory system 110 include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency identification (RFID) device, or one of various components constituting a computing system.

The memory device 150 may be a nonvolatile memory device and may retain data stored therein even though power is not supplied. The memory device 150 may store data provided from the host 102 through a write operation, and provide data stored therein to the host 102 through a read operation. The memory device 150 may include a plurality of memory dies (not shown), each memory die including a plurality of planes (not shown), each plane including a plurality of memory blocks 152 to 156. Each of the memory blocks 152 to 156 may include a plurality of pages, and each of the pages may include a plurality of memory cells coupled to a word line.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, write, program and erase operations of the memory device 150.

The controller 130 may include a host interface (I/F) 132, a processor 134, an error correction code (ECC) component 138, a Power Management Unit (PMU) 140, a NAND flash controller (NFC) 142 and a memory 144 all operatively coupled via an internal bus.

The host interface 132 may be configured to process a command and data of the host 102, and may communicate with the host 102 through one or more of various interface protocols such as universal serial bus (USB), multi-media card (MMC), peripheral component interconnect-express (PCI-E), small computer system interface (SCSI), serial-attached SCSI (SAS), serial advanced technology attachment (SATA), parallel advanced technology attachment (PATA), enhanced small disk interface (ESDI) and integrated drive electronics (IDE).

The ECC component 138 may detect and correct an error contained in the data read from the memory device 150. In other words, the ECC component 138 may perform an error correction decoding process to the data read from the memory device 150 through an ECC code used during an ECC encoding process. According to a result of the error correction decoding process, the ECC component 138 may output a signal, for example, an error correction success/fail signal. When the number of error bits is more than a threshold value of correctable error bits, the ECC component 138 may not correct the error bits, and instead may output an error correction fail signal.

The ECC component 138 may perform error correction through a coded modulation such as Low Density Parity Check (LDPC) code, Bose-Chaudhri-Hocquenghem (BCH) code, turbo code, Reed-Solomon code, convolution code, Recursive Systematic Code (RSC), Trellis-Coded Modulation (TCM) and Block coded modulation (BCM). However, the error correction techniques are not limited thereto. As such, the ECC component 138 may include any and all circuits, modules, systems or devices for suitable error correction.

The PMU 140 may provide and manage power of the controller 130.

The NFC 142 may serve as a memory/storage interface for interfacing the controller 130 and the memory device 150 such that the controller 130 controls the memory device 150 in response to a request from the host 102. When the memory device 150 is a flash memory or specifically a NAND flash memory, the NFC 142 may generate a control signal for the memory device 150 and process data to be provided to the memory device 150 under the control of the processor 134. The NFC 142 may work as an interface (e.g., a NAND flash interface) for processing a command and data between the controller 130 and the memory device 150. Specifically, the NFC 142 may support data transfer between the controller 130 and the memory device 150.

The memory 144 may serve as a working memory of the memory system 110 and the controller 130, and store data for driving the memory system 110 and the controller 130. The controller 130 may control the memory device 150 to perform read, write, program and erase operations in response to a request from the host 102. The controller 130 may provide data read from the memory device 150 to the host 102, may store data provided from the host 102 into the memory device 150. The memory 144 may store data required for the controller 130 and the memory device 150 to perform these operations.

The memory 144 may be embodied by a volatile memory. For example, the memory 144 may be embodied by static random access memory (SRAM) or dynamic random access memory (DRAM). The memory 144 may be disposed within or externally to the controller 130. FIG. 1 exemplifies the memory 144 disposed within the controller 130. In another embodiment, the memory 144 may be embodied by an external volatile memory having a memory interface transferring data between the memory 144 and the controller 130.

The processor 134 may control the overall operations of the memory system 110. The processor 134 may drive firmware to control the overall operations of the memory system 110. The firmware may be referred to as flash translation layer (FTL).

The processor 134 of the controller 130 may include a management unit (not illustrated) for performing a bad management operation of the memory device 150. The management unit may perform a bad block management operation of checking a bad block, in which a program fail occurs due to the characteristic of a NAND flash memory during a program operation, among the plurality of memory blocks 152 to 156 included in the memory device 150. The management unit may write the program-failed data of the bad block to a new memory block. In the memory device 150 having a 3D stack structure, the bad block management operation may reduce the use efficiency of the memory device 150 and the reliability of the memory system 110. Thus, the bad block management operation needs to be performed with more reliability.

Figure 2:
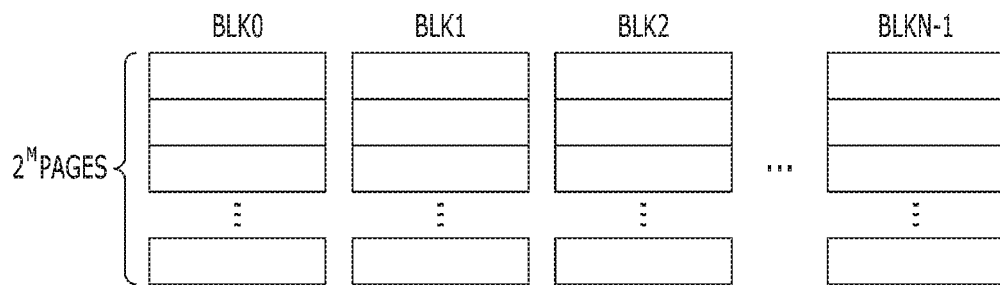
FIG. 2 is a schematic diagram illustrating an exemplary configuration of a memory device employed in the memory system shown in FIG. 1.

FIG. 2 is a schematic diagram illustrating the memory device 150.

Referring to FIG. 2, the memory device 150 may include a plurality of memory blocks BLK0 to BLKN-1, and each of these blocks may include a plurality of pages, for example, $2^M$ pages, the number of which may vary according to circuit design. Memory cells included in the respective memory blocks 0 to N-1 may be one or more of a single level cell (SLC) storing 1-bit data, or a multi-level cell (MLC) storing 2- or more bit data. In an embodiment, the memory device 150 may include a plurality of triple level cells (TLC) each storing 3-bit data. In another embodiment, the memory device may include a plurality of quadruple level cells (QLC) each storing 4-bit level cell.

Figure 3:
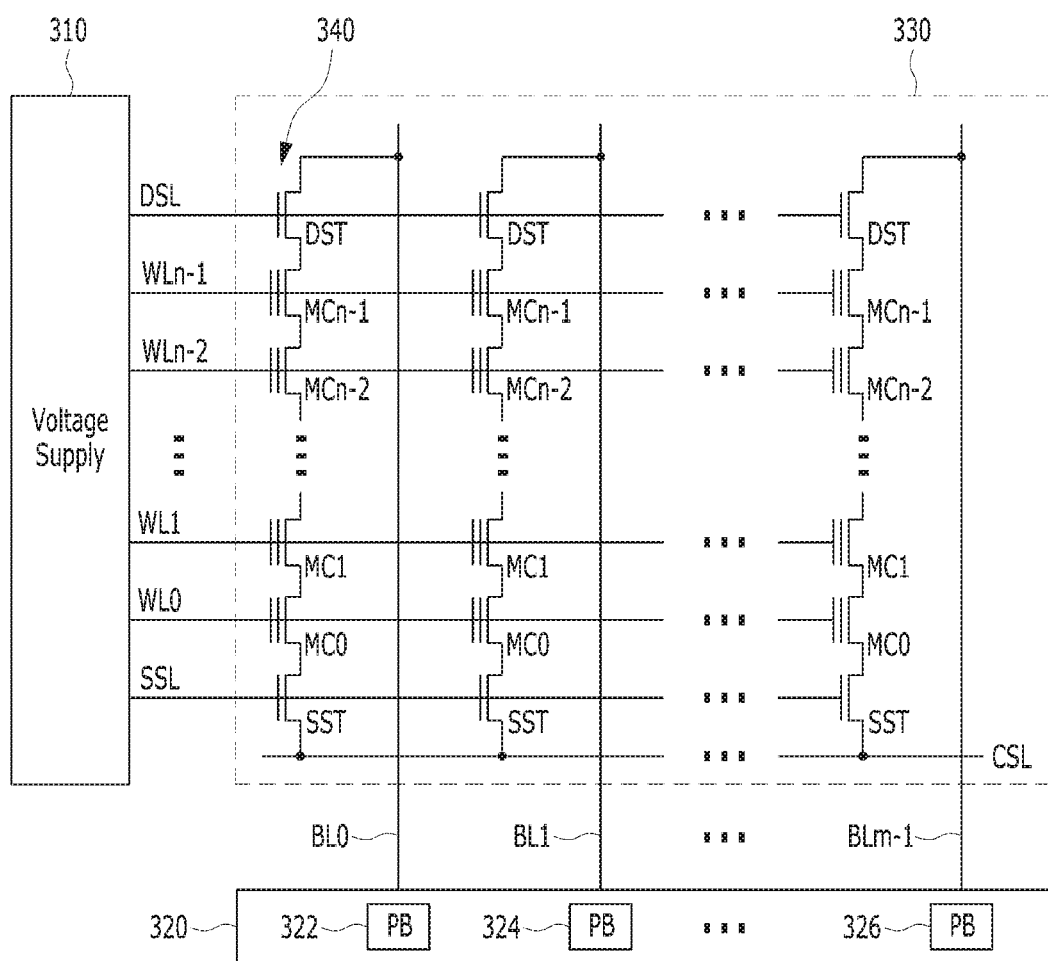
FIG. 3 is a circuit diagram illustrating an exemplary configuration of a memory cell array of a memory block in the memory device shown in FIG. 2.

FIG. 3 is a circuit diagram illustrating an exemplary configuration of a memory cell array of a memory block in the memory device 150.

Referring to FIG. 3, a memory block 330, which may correspond to any of the plurality of memory blocks 152 to 156, may include a plurality of cell strings 340 coupled to a plurality of corresponding bit lines BL0 to BLm-1. The cell string 340 of each column may include one or more drain select transistors DST and one or more source select transistors SST. Between the drain and source select transistors DST and SST, a plurality of memory cells MC0 to MCn-1 may be coupled in series. In an embodiment, each of the memory cell transistors MC0 to MCn-1 may be embodied by an MLC capable of storing data information of a plurality of bits. Each of the cell strings 340 may be electrically coupled to a corresponding bit line among the plurality of bit lines BL0 to BLm-1. For example, as illustrated in FIG. 3, the first cell string is coupled to the first bit line BL0, and the last cell string is coupled to the last bit line BLm-1.

Although FIG. 3 illustrates NAND flash memory cells, the invention is not limited in this way. It is noted that the memory cells may be NOR flash memory cells, or hybrid flash memory cells including two or more kinds of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply 310 which provides word line voltages including a program voltage, a read voltage and a pass voltage to supply to the word lines according to an operation mode. The voltage generation operation of the voltage supply 310 may be controlled by a control circuit (not illustrated). Under the control of the control circuit, the voltage supply 310 may select one of the memory blocks (or sectors) of the memory cell array, select one of the word lines of the selected memory block, and provide the word line voltages to the selected word line and the unselected word lines as may be needed.

The memory device 150 may include a read/write circuit 320 which is controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs), and each of the page buffers 322 to 326 may include a plurality of latches (not illustrated).

Figure 4:
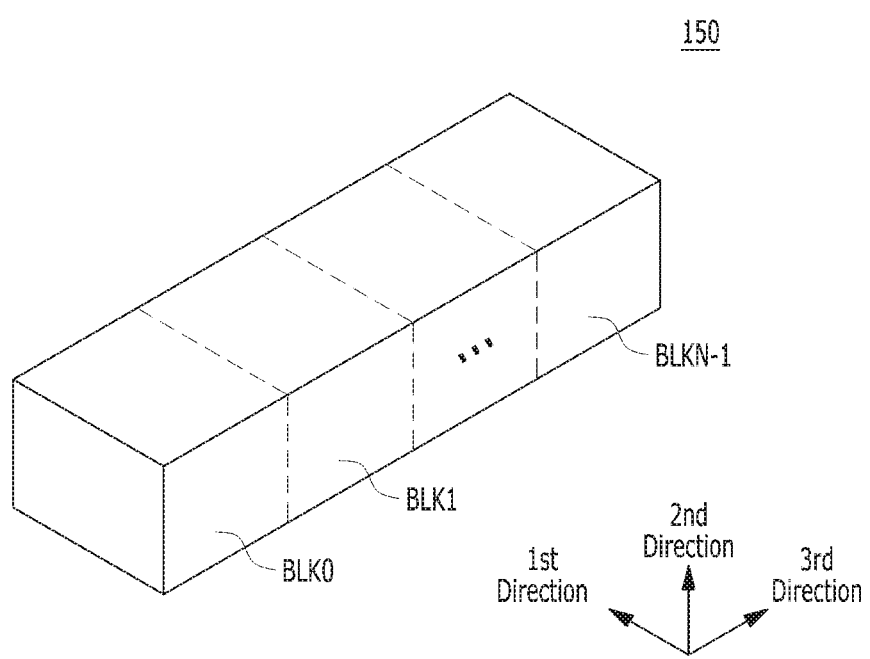
FIG. 4 is a schematic diagram illustrating an exemplary three-dimensional structure of the memory device shown in FIG. 2.

FIG. 4 is a schematic diagram illustrating an exemplary 3D structure of the memory device 150.

The memory device 150 may be embodied by a 2D or 3D memory device. Specifically, as illustrated in FIG. 4, the memory device 150 may be embodied by a nonvolatile memory device having a 3D stack structure. When the memory device 150 has a 3D structure, the memory device 150 may include a plurality of memory blocks BLK0 to BLKN-1, each having a 3D structure (or vertical structure).

Figure 5:
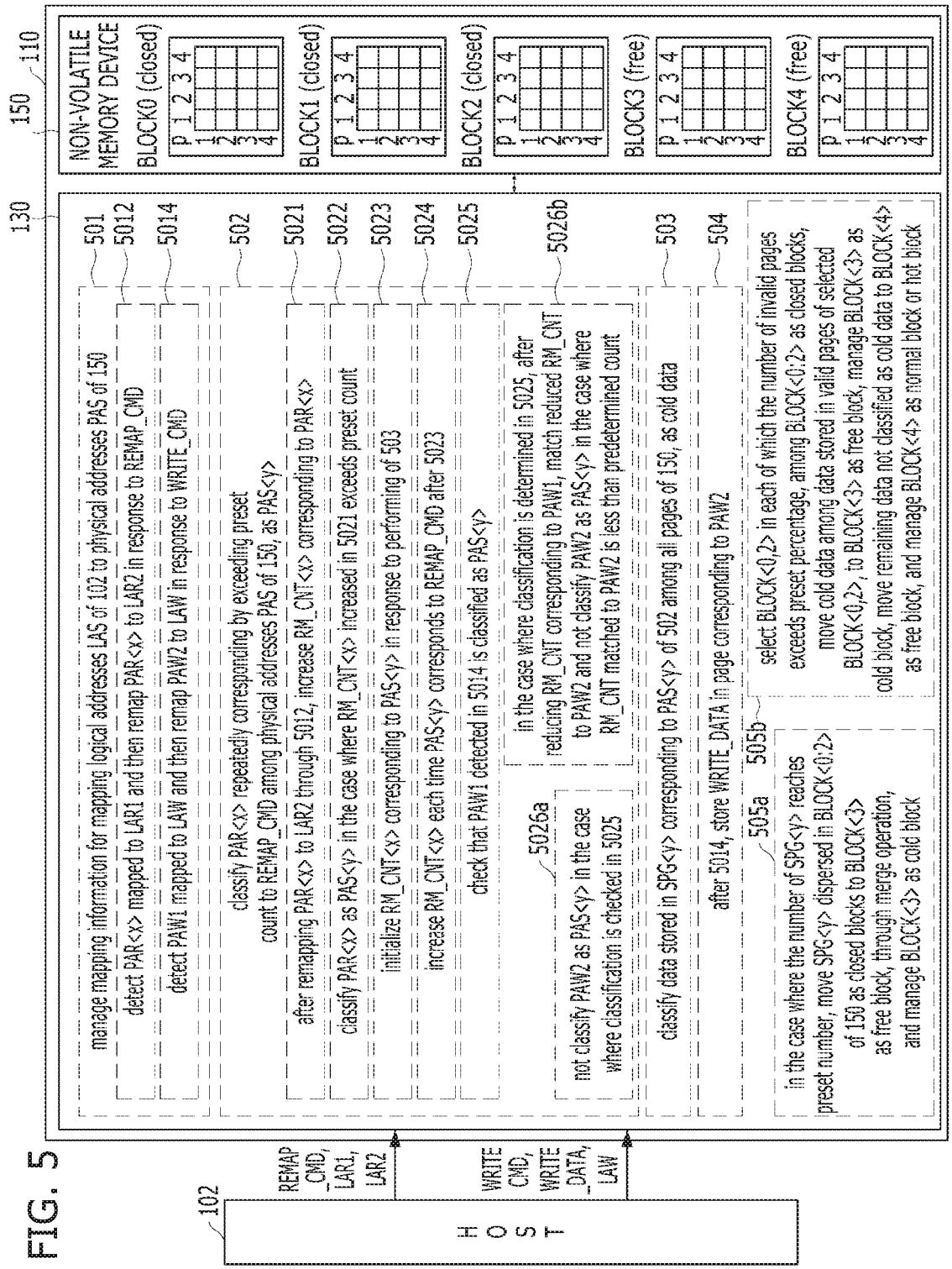
FIGS. 5, 6A and 6B are block diagrams to assist in the explanation of an operation of classifying stored data depending on a remap command in a memory system in accordance with an embodiment of the present disclosure.
Figure 6A:
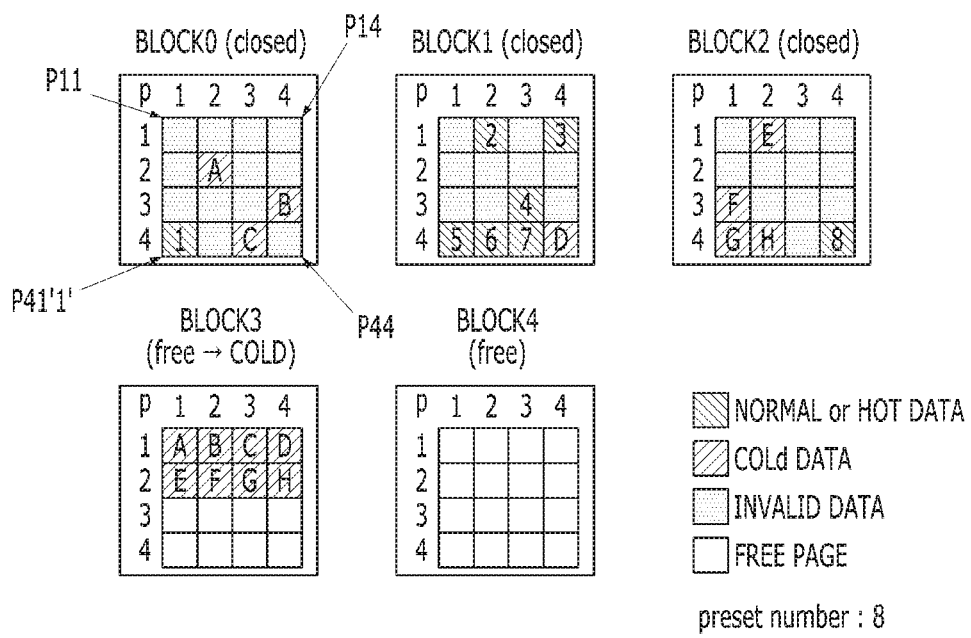
Figure 6B:
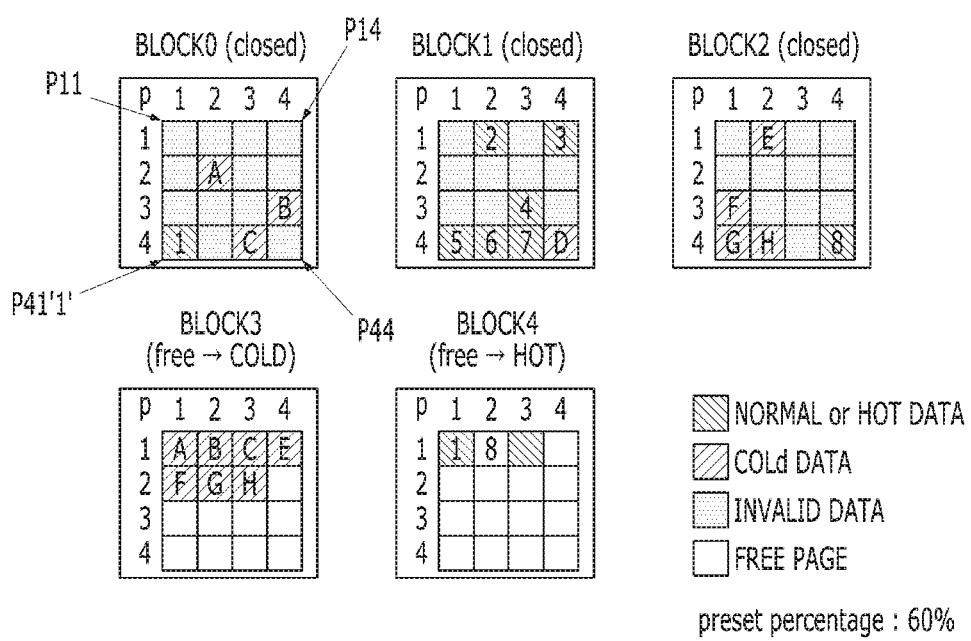

FIGS. 5, 6A and 6B are block diagrams to assist in the explanation of an operation of classifying stored data depending on a remap command in a memory system in accordance with an embodiment of the present disclosure.

First, referring to FIG. 5, it may be seen that, by referring to the configuration of the data processing system 100 shown in FIG. 1, there is illustrated a configuration of the data processing system 100 including the host 102 and the memory system 110.

As described above with reference to FIG. 1, the memory system 110 includes the controller 130 and the memory device 150.

The memory device 150 includes a plurality of memory blocks BLOCK<0:4> as described above with reference to FIG. 1. Each of the memory blocks BLOCK<0:4> includes a plurality of pages P<11:44>.

It may be seen in the drawing that 16 pages P<11:44> are included in the form of a matrix having four rows and four columns in each of the memory blocks BLOCK<0:4>. Thus, reference symbols corresponding to the four pages of the first row may be defined as P<11, 12, 13, 14>, reference symbols corresponding to the four pages of the second row may be defined as P<21, 22, 23, 24>, reference symbols corresponding to the four pages of the third row may be defined as P<31, 32, 33, 34>, and reference symbols corresponding to the four pages of the fourth row may be defined as P<41, 42, 43, 44>.

Since 16 pages P<11:44> are included in each of the memory blocks BLOCK<0:4> and reference symbols are used in a duplicative manner, when reference symbols are used to distinguish memory blocks, the following definitions may be used. Reference symbols representing the 16 pages included in a zeroth memory block BLOCK0 may be defined as BLOCK0_P<11:44>, reference symbols representing the 16 pages included in a first memory block BLOCK1 may be defined as BLOCK1_P<11:44>, reference symbols representing the 16 pages included in a second memory block BLOCK2 may be defined as BLOCK2_P<11:44>, reference symbols representing the 16 pages included in a third memory block BLOCK3 may be defined as BLOCK3_P<11:44>, and reference symbols representing the 16 pages included in a fourth memory block BLOCK4 may be defined as BLOCK4_P<11:44>.

For reference, while a configuration in which only one nonvolatile memory device 150 is included in the memory system 110 is disclosed in FIG. 5, this is merely an example; multiple nonvolatile memory devices may be included in the memory system 110. Also, while a configuration in which five memory blocks BLOCK<0:4> are included in the nonvolatile memory device 150 is disclosed in FIG. 5, this too is merely an example; more or less than five memory blocks may be included in the nonvolatile memory device 150. Further, while a configuration in which 16 pages P<11:44> are included in each of the memory blocks BLOCK<0:4> is disclosed in FIG. 5, this is also is merely an example; more or less than 16 pages may be actually included in each of the memory blocks BLOCK<0:4>.

While a host interface 132, a processor 134, an ECC component 138, a PMU 140, a NAND flash controller 142 and a memory 144, which are illustrated in FIG. 1 as being in a controller 130, are not illustrated as being in the controller 130 of FIG. 5, these components are merely omitted from FIG. 5 for clarity; such components may be included in the controller 130.

Reference symbols to be used in the following description may be defined as follows. A reference symbol corresponding to logical addresses is LAS, a reference symbol corresponding to physical addresses is PAS, a reference symbol corresponding to a command is CMD, the term 'remap' in a remap command may correspond to a reference symbol REMAP or RM, and a reference symbol corresponding to a specific page is SPG. Moreover, a reference symbol corresponding to a physical address corresponding to a remap command is PAR, a reference symbol corresponding to a logical address corresponding to a remap command is LAR, a reference symbol corresponding to a physical address corresponding to a write command is PAW, a reference symbol corresponding to a logical address corresponding to a write command is LAW, and each of x and y in reference symbols <x> and <y> means an optional natural number.

In detail, the controller 130 manages mapping information for mapping logical addresses LAS used in the host 102 to physical addresses PAS corresponding to the pages BLOCK<0:4>_P<11:44> at operation 501.

The controller 130 selects a physical address PAR<x>, which becomes, by exceeding a first threshold count, a target physical address of a remap command REMAP_CMD among the physical addresses PAS, and classifies the selected physical address PAR<x> as a specific physical address PAS<y> at operation 502. The first threshold count may be a natural number of 2 or more.

The controller 130 classifies the data stored in a specific page SPG<y> corresponding to the specific physical address PAS<y> as cold data at operation 503.

When a first logical address LAR1 and a second logical address LAR2 corresponding to the remap command REMAP_CMD are applied from the host 102, the controller 130 detects a physical address PAR<x> corresponding to the first logical address LAR1 through the mapping information, and then, remaps the detected physical address PAR<x> to the second logical address LAR2 at operation 5012.

Describing the operation 5012 in detail, in correspondence to the remap command REMAP_CMD, the controller 130 remaps or changes a logical address mapped to a physical address.

For example, in correspondence to the remap command REMAP_CMD, the first logical address LAR1 having the value of 100 and the second logical address LAR2 having the value of 200 may be applied to the controller 130. In response to this, the controller 130 may detect, through the mapping information, a physical address PAR<x> having the value of 5200 that is mapped to the first logical address LAR1 having the value of 100. Then, in response to the remap command REMAP_CMD, the controller 130 changes the existing first logical address LAR1 having the value of 100 to the second logical address LAR2 having the value of 200 to remap the logical address mapped to the physical address PAR<x> having the value of 5200.

As is understood from the description for the operation 5012, the controller 130 does not change the physical state of the data stored in the nonvolatile memory device 150, for example, does not copy, move or erase the data, in response to the remap command REMAP_CMD applied from the host 102. Instead, the controller 130 changes logical information, that is, a logical address, for managing, in the host 102, the data stored in the nonvolatile memory device 150, in response to the remap command REMAP_CMD.

In this regard, the fact that, after specific data is stored in the nonvolatile memory device 150, the physical state of the specific data is not changed even though a remapping operation of changing a logical information for managing the specific data in the host 102 is performed according to the operation 5012 to exceed the first threshold count in the operation 502 may be a sufficient basis for the operation 503 of classifying the specific data as cold data.

In other words, the controller 130 classifies, after determining one physical address PAR<x> to store specific data according to the operation 501, one physical address PAR<x> of which value is not changed even though a logical address to be mapped is changed according to the operation 5012 and the operation 502 to exceed the first threshold count, as the specific physical address PAS<y>. Therefore, the operation of classifying, in the controller 130, the data stored in the specific page SPG<y> indicated by the specific physical address PAS<y> as cold data according to the operation 503 may be a sufficient basis for an operation of determining the characteristics of the data stored in the nonvolatile memory device 150.

Both the physical address PAR<x> which is determined as corresponding to the remap command REMAP_CMD from the host 102 and the specific physical address PAS<y> which corresponds, by exceeding the first threshold count, to the remap command REMAP_CMD from the host 102 mean any one of the physical addresses PAS. For example, it may be detected that each of four physical addresses PAR<B01, B05, B08, B013> respectively corresponding to the first page P<11>, the fifth page P<21>, the eighth page P<24> and the thirteenth page P<41> of the zeroth memory block BLOCK0 has become a target physical address of the remap command REMAP_CMD at least one time. 'x' may be any one value among the four values, that is, B01, B05, B08, and B013. For reference, in the reference symbols B01, B05, B08, and B013 used as the value of 'x,' B0 commonly used is a reference symbol corresponding to the zeroth memory block BLOCK0, 1 is a reference symbol that means a physical address corresponding to the first page P<11>, 5 is a reference symbol that means a physical address corresponding to the fifth page P<21>, 8 is a reference symbol that means a physical address corresponding to the eighth page P<24>, and 13 is a reference symbol that means a physical address corresponding to the thirteenth page P<41>.

It may be exemplified that, among the detected four physical addresses PAR<B01, B05, B08, B013>, the number of physical addresses which are detected as corresponding, by exceeding the first threshold count, to the remap command REMAP_CMD and are thus classified as the specific physical address PAS<y> is 2, that is, only the physic& addresses PAR<B01, B05> corresponding to the first page P<11> and the fifth page P<21> of the zeroth memory block BLOCK0 are included. 'y' may be any one value of the two values, that is, B01 and B05. For reference, the reference symbols B01 and B05 used as the value of 'y' are the same pattern as the above-described reference symbols used as the value of 'x.' Namely, in the reference symbols B01 and B05 used as the value of 'y,' B0 commonly used is a reference symbol corresponding to the zeroth memory block BLOCK0, 1 is a reference symbol that means a physical address corresponding to the first page P<11> and 5 is a reference symbol that means a physical address corresponding to the fifth page P<21>.

That is to say, after selecting one physical address PAR<x> as a target physical address of the remap command REMAP_CMD among the all physical addresses PAS through the operation 5012, the controller 130 detects whether PAR<x> selected in the operation 5012 has become a target physical address of the remap command REMAP_CMD by exceeding the first threshold count and determines whether to classify PAR<x> selected in the operation 5012, as the specific physical address PAS<y>, through the operation 502. One physical address PAR<x> corresponding to the remap command REMAP_CMD may be changed each time the remap command REMAP_CMD is applied from the host 102, through the operation 5012. A plurality of physical addresses PAR<x> may simultaneously become target physical addresses of the remap command REMAP_CMD at least one time. The controller 130 may manage which of the physical addresses PAS has become a target physical address of the remap command REMAP_CMD by their respective counts. Of course, in the case where a plurality of physical addresses PAR<x> simultaneously become target physical addresses of the remap command REMAP_CMD by exceeding the first threshold count, the controller 130 may simultaneously manage a plurality of specific physical addresses PAS<y>.

For reference, the controller 130 may detect a physical address PAR<x> which becomes a target physical address of the remap command REMAP_CMD at least one time and a specific physical address PAS<y> which becomes a target physical address of the remap command REMAP_CMD by exceeding the first threshold count, among the physical addresses PAS, through a scheme of managing the value of a specific bit determined in advance among the plurality of bits included in each of the physical addresses PAS. The specific bit determined in advance may be any one among reserved bits which are not normally used, among the plurality of bits included in each of the physical addresses PAS.

For example, the controller 130 may classify a physical address, in which a set first bit has a value of 1, as a physical address PAR<x> which becomes a target physical address of the remap command REMAP_CMD at least one time, and may classify a physical address, in which a set second bit has a value of 1, as a specific physical address PAS<y> which becomes a target physical address of the remap command REMAP_CMD by exceeding the first threshold count.

Describing the above-described operation 502 in detail, the controller 130 uses a remap count RM_CNT<x> as follows, to select a physical address PAR<x> which becomes a target physical address of the remap command REMAP_CMD by exceeding the first threshold count, among the physical addresses PAS.

First, after detecting a physical address PAR<x> as a target physical address of the remap command REMAP_CMD and mapping the physical address PAR<x> to the second logical address LAR2 through the operation 5012, the controller 130 increases the value of a remap count RM_CNT<x> corresponding to the detected physical address PAR<x> at operation 5021.

For example, in the case where the physical address PAR<x> detected at the operation 5012 becomes a target physical address of to the remap command REMAP_CMD for a first time, the controller 130 increases the remap count RM_CNT<x> of the physical address PAR<x> detected at the operation 5012, from 0 to 1. In the case where the physical address PAR<x> detected at the operation 5012 becomes a target physical address of to the remap command REMAP_CMD a second time, the controller 130 increases the remap count RM_CNT<x> of the physical address PAR<x> detected at the operation 5012, from 1 to 2.

As another example, in the case where, at the operation 5012, the physical address PAR<B01> corresponding to the first page P<11> of the zeroth memory block BLOCK0 becomes a target physical address of the remap command REMAP_CMD for a second time, the controller 130 increases a remap count RM_CNT<B01> corresponding to the physical address PAR<B01> corresponding to the first page P<11> of the zeroth memory block BLOCK0, from 1 to 2. In the case where, at the operation 5012, the physical address PAR<B05> corresponding to the fifth page P<21> of the zeroth memory block BLOCK0 becomes a target physical address of the remap command REMAP_CMD for the first time, the controller 130 increases a remap count RM_CNT<B05> corresponding to the physical address PAR<B05> corresponding to the fifth page P<21> of the zeroth memory block BLOCK0, from 0 to 1.

In this way, after increasing, through the operation 5021, the value of the remap count RM_CNT<x> corresponding to the physical address PAR<x> detected at the operation 5012, the controller 130 checks whether the value of the remap count RM_CNT<x> corresponding to the detected physical address PAR<x> exceeds the first threshold count, and, in the case where, as a result of checking, the value of the remap count RM_CNT<x> exceeds the first threshold count, classifies the detected physical address PAR<x> as the specific physical address PAS<y> at operation 5022.

For example, when assuming that the first threshold count is 2, the controller 130 does not classify the physical address PAR<x> of which remap count RM_CNT<x> is increased to 1 or 2 at the operation 5021, as the specific physical address PAS<y> at the operation 5022. On the other hand, the controller 130 classifies the physical address PAR<x> of which remap count RM_CNT<x> is increased to 3 through the operation 5021, as the specific physical address PAS<y> at the operation 5022.

As another example, when assuming that the first threshold count is 2, the controller 130 may increase the remap count RM_CNT<B01> of the physical address PAR<B01> corresponding to the first page P<11> of the zeroth memory block BLOCK0 to 2 at the operation 5021. However, the controller 130 does not classify the physical address PAR<B01> corresponding to the first page P<11> of the zeroth memory block BLOCK0 as the specific physical address PAS<y> at the operation 5022. The controller 130 may increase the remap count RM_CNT<B05> of the physical address PAR<B05> corresponding to the fifth page P<21> of the zeroth memory block BLOCK0 to 3 at the operation 5021. Accordingly, the controller 130 classifies the physical address PAR<B05> corresponding to the fifth page P<21> of the zeroth memory block BLOCK0 as the specific physical address PAS<y> at the operation 5022.

As described above, the controller 130 may classify the specific physical address PAS<y> among the physical addresses PAS through the operation 5021 and the operation 5022 included in the operation 502, and classifies the data stored in a specific page SPG<y> corresponding to the specific physical address PAS<y> as cold data through the above-described operation 503.

In response to that the operation 503 is performed, that is, the operation of classifying the data stored in the specific page SPG<y> corresponding to the specific physical address PAS<y> as cold data is performed, the controller 130 initializes the remap count RM_CNT<x> corresponding to the specific physical address PAS<y> at operation 5023. For example, the value of the remap count RM_CNT<x> corresponding to the specific physical address PAS<y> is initialized to 0.

In this way, after the operation 5023 is performed, the controller 130 increases the remap count RM_CNT<x> corresponding to the specific physical address PAS<y> each time the specific physical address PAS<y> is classified at operation 5024.

In other words, after initializing, through the operation 5023, the remap count RM_CNT<x> corresponding to the specific physical address PAS<y> at a time when the data stored in the specific page SPG<y> corresponding to the specific physical address PAS<y> is classified as cold data, the controller 130 increases again the remap count RM_CNT<x> corresponding to the specific physical address PAS<y> each time the specific physical address PAS<y> is classified, through the operation 5024. Through this, the controller 130 may manage a count by which the specific physical address PAS<y> is classified, based on the operation 503.

When a write logical address LAW and write data WRITE_DATA corresponding to a write command WRITE_CMD are applied from the host 102, the controller 130 detects a first physical address PAW1 mapped to the write logical address LAW through the mapping information and then maps a second physical address PAW2 to the write logical address LAW in place of the detected first physical address PAW1 at operation 5014. Namely, the controller 130 remaps the first physical address PAW1 mapped to the write logical address LAW, to the second physical address PAW2, in response to the write command WRITE_CMD, at the operation 5014. After mapping the second physical address PAW2 to the write logical address LAW through the operation 5014, the controller 130 stores the write data WRITE_DATA in a page corresponding to the second physical address PAW2 in response to the write command WRITE_CMD at operation 504.

Separately from the operation 504 described above, the controller 130 checks whether the first physical address PAW1 mapped to the write logical address LAW at the operation 5014 has been classified, through the operation 502, as the specific physical address PAS<y> at operation 5025. For example, in the case where the value of the second bit among the bits included in the first physical address PAW1 is 0, the controller 130 determines that the first physical address PAW1 has not been classified as the specific physical address PAS<y>. Conversely, in the case where the value of the second bit among the bits included in the first physical address PAW1 is 1, the controller 130 determines that the first physical address PAW1 has been classified as the specific physical address PAS<y>.

In the case where it is checked at the operation 5025 that the first physical address PAW1 has not been classified as the specific physical address PAS<y>, the controller 130 does not perform a separate additional operation and immediately performs the above-described operation 504.

Conversely, in the case where it is checked at the operation 5025 that the first physical address PAW1 has been classified as the specific physical address PAS<y>, the controller 130 may perform any one operation of an operation 5026A and an operation 5026B to be described below.

In detail, describing the operation 5026A, in the case where it is checked at the operation 5025 that the first physical address PAW1 has been classified as the specific physical address PAS<y>, the controller 130 does not classify the second physical address PAW2 as the specific physical address PAS<y>.

That is to say, at the operation 5026A, the controller 130 determines the meaning of the operation of remapping the second physical address PAW2 to the write logical address LAW in place of the first physical address PAW1 at the operation 5014, as that the data having been stored in a page corresponding to the first physical address PAW1 and the write data WRITE_DATA stored in a page corresponding to the second physical address PAW2 are separate from each other as completely different data.

Therefore, at the operation 5026A, even though the data stored in the page corresponding to the first physical address PAW1 classified as the specific physical address PAS<y> has already been classified as cold data, the controller 130 does not classify the second physical address PAW2 as a specific physical address PAS<y> and thereby does not classify the write data WRITE_DATA stored in the page corresponding to the second physical address PAW2 as cold data.

Describing the operation 5026B, in the case where it is determined at the operation 5025 that the first physical address PAW1 has been classified as the specific physical address PAS<y>, the controller 130 reduces the value of the remap count RM_CNT<x> corresponding to the first physical address PAW1 having been mapped to the write logical address LAW at the operation 5014, assigns the reduced value to the remap count RM_CNT<x> of the second physical address PAW2, and then checks whether the value of the remap count RM_CNT<x> corresponding to the second physical address PAW2 is less than a second threshold count. In the case where, as a result of checking, the value of the remap count RM_CNT<x> is less than the second threshold count, the controller 130 does not classify the second physical address PAW2 as the specific physical address PAS<y>. The second threshold count may be set to be less than or equal to the first threshold count.

In other words, at the operation 5026B, the controller 130 determines the meaning of the operation of remapping the second physical address PAW2 to the write logical address LAW in place of the first physical address PAW1 at the operation 5014, as that the data having been stored in a page corresponding to the first physical address PAW1 and the write data WRITE_DATA stored in a page corresponding to the second physical address PAW2 have a close relationship. For example, it is determined that an updated version of the data stored in the page corresponding to the first physical address PAW1 is the write data WRITE_DATA stored in the page corresponding to the second physical address PAW2.

Therefore, at the operation 5026B, because the data stored in the page corresponding to the first physical address PAW1 classified as the specific physical address PAS<y> has already been classified as cold data through the operation 503, the controller 130 checks whether the write data WRITE_DATA stored in the page corresponding to the second physical address PAW2 satisfies a specific condition, and depending on a checking result, selectively classifies the write data WRITE_DATA stored in the page corresponding to the second physical address PAW2, as cold data.

In order to check whether the write data WRITE_DATA stored in the page corresponding to the second physical address PAW2 satisfies the specific condition, the controller 130 reduces the value of the remap count RM_CNT<x> corresponding to the first physical address PAW1 having been mapped to the write logical address LAW at the operation 5014, assigns the reduced value to the remap count RM_CNT<x> of the second physical address PAW2, and then checks whether the value of the remap count RM_CNT<x> corresponding to the second physical address PAW2 is less than the second threshold count.

In the case where, as a result of checking, the value of the remap count RM_CNT<x> corresponding to the second physical address PAW2 is less than the second threshold count, the controller 130 does not classify the second physical address PAW2 as the specific physical address PAS<y>, and accordingly, the write data WRITE_DATA stored in the page corresponding to the second physical address PAW2 is not classified as cold data.

In the case where, as a result of checking, the value of the remap count RM_CNT<x> corresponding to the second physical address PAW2 is equal to or greater than the second threshold count, the controller 130 classifies the second physical address PAW2 as the specific physical address PAS<y>, and accordingly, the write data WRITE_DATA stored in the page corresponding to the second physical address PAW2 is classified as cold data.

Since the operation 5026A and the operation 5026B are mutually exclusive, both operations cannot be performed at the same time. Which of the two operations is selected may depend on certain conditions and/or system design.

In the case where the number of specific pages SPG<y> in which cold data are stored reaches a set number, the controller 130 moves the cold data stored in the set number of specific pages SPG<y> dispersedly included in the memory blocks BLOCK<0:4>, to a specific memory block among the memory blocks BLOCK<0:4>, through a merge operation, and then manages the specific memory block as a cold block at operation 505A.

An example of the above operation 505A is described by referring to FIG. 6A.

First, it may be assumed that, among the entire memory blocks BLOCK<0:4>, each of the zeroth memory block BLOCK0, the first memory block BLOCK1 and the second memory block BLOCK2 is in a closed state in which a program operation is completed and each of the third memory block BLOCK3 and the fourth memory block BLOCK4 is in a free state.

By the operations 501, 502, 503 and 504 before the operation 505A, the controller 130 performs a classifying task such that three pieces of cold data A, B and C and one piece of normal or hot data 1 are stored in the zeroth memory block BLOCK0, six pieces of normal or hot data 2, 3, 4, 5, 6 and 7 and one piece of cold data D are stored in the first memory block BLOCK1 and four pieces of cold data E, F, G and H and one piece of normal or hot data 8 are stored in the second memory block BLOCK2.

Namely, through the operations 501, 502, 503 and 504 before the operation 505A, the controller 130 classifies the page 22 BLOCK0_P22, the page 34 BLOCK0_P34 and the page 43 BLOCK0_P43 of the zeroth memory block BLOCK0, the page 44 BLOCK1_P44 of the first memory block BLOCK1 and the page 12 BLOCK2_P12, the page 31 BLOCK2_P31, the page 41 BLOCK2_P41 and the page 42 BLOCK2_P42 of the second memory block BLOCK2 as the specific pages SPG<BLOCK0_P22, BLOCK0_P34, BLOCK0_P43, BLOCK1_P44, BLOCK2_P12, BLOCK2_P31, BLOCK2_P41, BLOCK2_P42>, and accordingly, classifies the data A, B, C, D, E, F, G and H stored in the specific pages SPG<BLOCK0_P22, BLOCK0_P34, BLOCK0_P43, BLOCK1_P44, BLOCK2_P12, BLOCK2_P31, BLOCK2_P41, BLOCK2_P42> as cold data.

Thereafter, through the operation 505A, the controller 130 may detect that the number of the specific pages SPG<BLOCK0_P22, BLOCK0_P34, BLOCK0_P43, BLOCK1_P44, BLOCK2_P12, BLOCK2_P31, BLOCK2_P41, BLOCK2_P42> has reached 8 as the set number. According to the detecting result, the controller 130 moves the cold data A, B, C, D, E, F, G and H stored in the eight specific pages SPG<BLOCK0_P22, BLOCK0_P34, BLOCK0_P43, BLOCK1_P44, BLOCK2_P12, BLOCK2_P31, BLOCK2_P41, BLOCK2_P42> to the third memory block BLOCK3 through a merge operation, and manages the third memory block BLOCK3 as a cold block.

Further, the controller 130 selects a memory block in which the number of invalid pages exceeds a set percentage, moves cold data stored in the valid pages of the selected memory block to a first memory block through a merge operation, and moves remaining data to a second memory block through a merge operation. The controller 130 manages the first memory block as a cold block, and manages the second memory block as a normal block or a hot block at operation 505B.

An example of the above operation 505B is described by referring to FIG. 6B.

First, it may be assumed that each of the zeroth memory block BLOCK0, the first memory block BLOCK1 and the second memory block BLOCK2 is in a closed state in which a program operation is completed and each of the third memory block BLOCK3 and the fourth memory block BLOCK4 is in a free state.

By the operations 501, 502, 503 and 504 before the operation 505B, the controller 130 performs a classifying task such that three pieces of cold data A, B and C and one piece of normal or hot data 1 are stored in the zeroth memory block BLOCK0, six pieces of normal or hot data 2, 3, 4, 5, 6 and 7 and one piece of cold data D are stored in the first memory block BLOCK1 and four pieces of cold data E, F, G and H and one piece of normal or hot data 8 are stored in the second memory block BLOCK2.

Namely, through the operations 501, 502, 503 and 504 before the operation 505B, the controller 130 classifies the page 22 BLOCK0_P22, the page 34 BLOCK0_P34 and the page 43 BLOCK0_P43 of the zeroth memory block BLOCK0, the page 44 BLOCK1_P44 of the first memory block BLOCK1 and the page 12 BLOCK2_P12, the page 31 BLOCK2_P31, the page 41 BLOCK2_P41 and the page 42 BLOCK2_P42 of the second memory block BLOCK2 as the specific pages SPG<BLOCK0_P22, BLOCK0_P34, BLOCK0_P43, BLOCK1_P44, BLOCK2_P12, BLOCK2_P31, BLOCK2_P41, BLOCK2_P42>, and accordingly, classifies the data A, B, C, D, E, F, G and H stored in the specific pages SPG<BLOCK0_P22, BLOCK0_P34, BLOCK0_P43, BLOCK1_P44, BLOCK2_P12, BLOCK2_P31, BLOCK2_P41, BLOCK2_P42> as cold data.

Thereafter, through the operation 505B, the controller 130 selects the zeroth memory block BLOCK0 and the second memory block BLOCK2 in each of which the number of invalid pages exceeds 60% as the set percentage, moves the cold data A, B, C, E, F, G and H stored in the valid pages of the selected zeroth memory block BLOCK0 and second memory block BLOCK2 to the third memory block BLOCK3 through a merge operation, and moves the remaining data 1 and 8 to the fourth memory block BLOCK4 through a merge operation. The controller 130 manages the third memory block BLOCK3 as a cold block, and manages the fourth memory block BLOCK4 as a normal or hot block.

Since the operation 505A and the operation 505B are mutually exclusive, both operations cannot be performed at the same time. Which of the two operations is selected may depend on certain conditions and/or system design.

Figure 7:
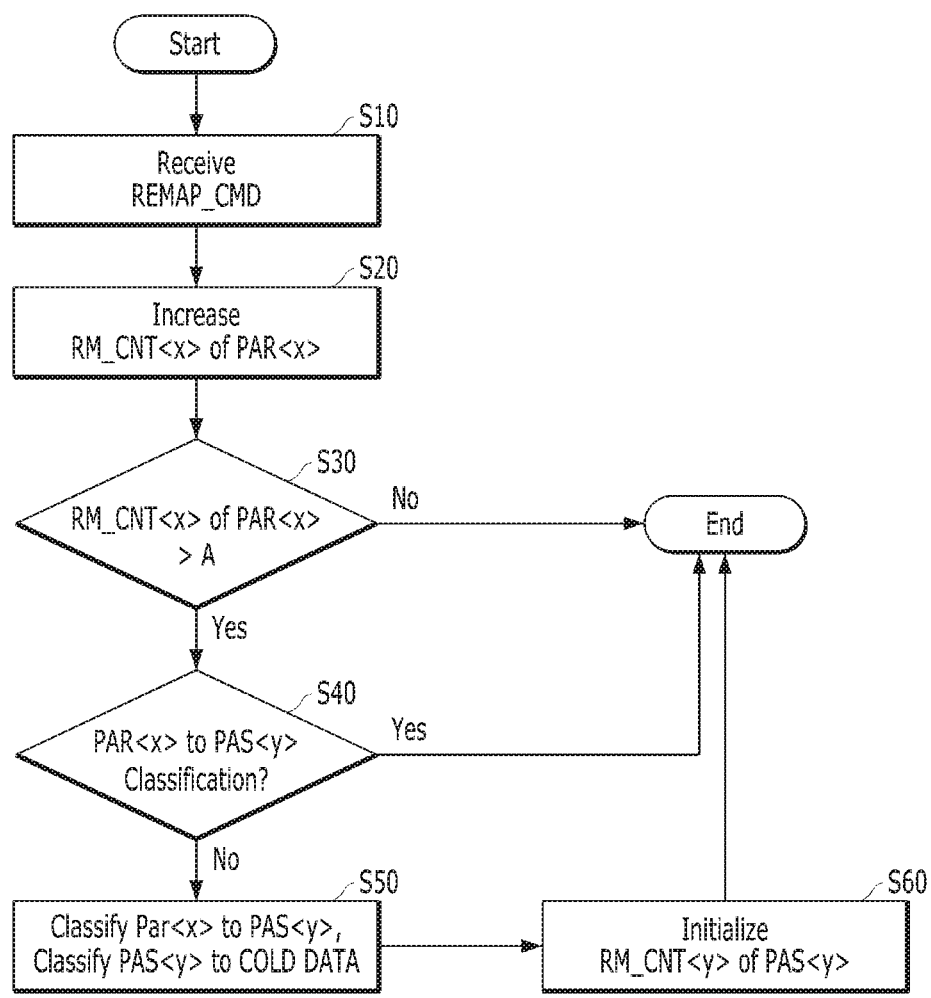
FIGS. 7, 8A and 8B are flow charts to assist in the explanation of an operation of classifying stored data depending on a remap command in a memory system in accordance with an embodiment of the present disclosure.
Figure 8A:
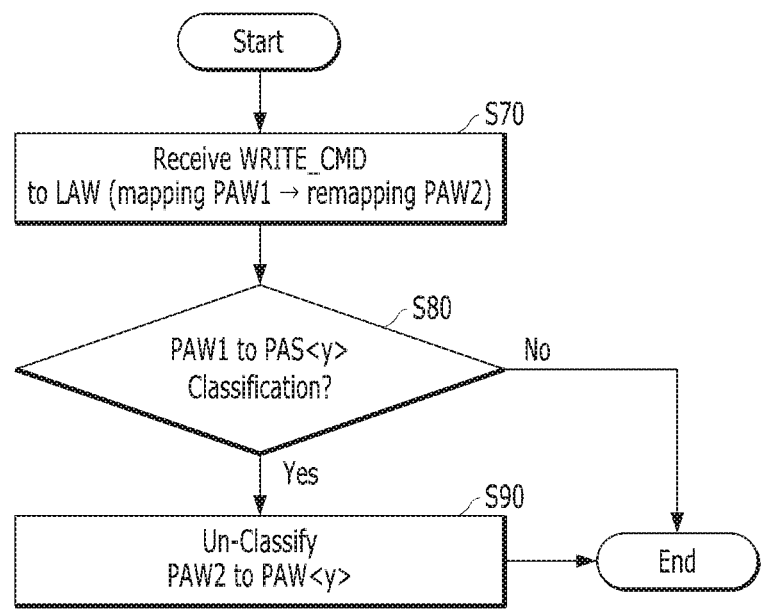
Figure 8B:
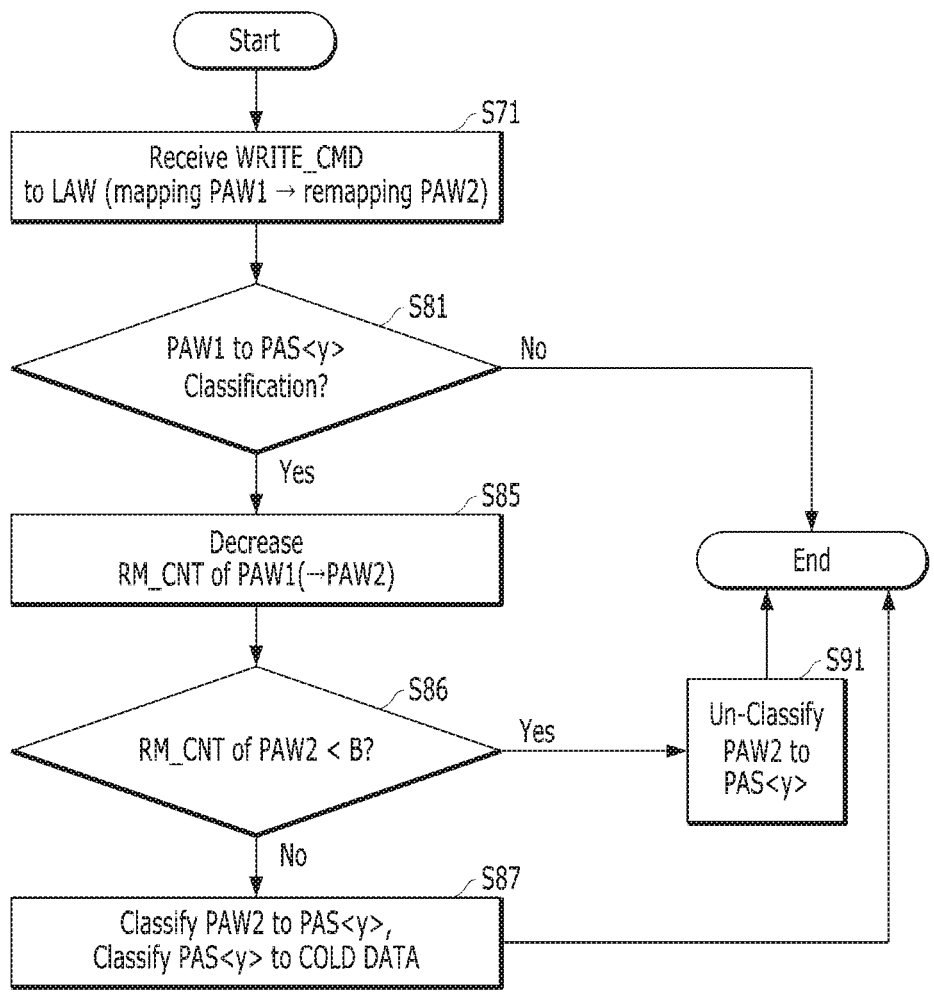

FIGS. 7, 8A and 8B are flow charts to assist in the explanation of an operation of classifying stored data depending on a remap command in a memory system in accordance with an embodiment of the present disclosure.

First, referring to FIG. 7, the flow chart shows operations of classifying a specific physical address PAS<y> among physical addresses PAS in response to a remap command REMAP_CMD and accordingly classifying the data stored in a specific page SPG<y> as cold data in the operation of the memory system 110 in accordance with an embodiment of the present disclosure described above with reference to FIGS. 5, 6A and 6B.

In detail, referring to FIG. 7, if the remap command REMAP_CMD is applied from the host 102, the operation of the controller 130 is started at operation S10.

In response to the operation S10, the controller 130 increases the remap count RM_CNT<x> of the physical address PAR<x> as a target physical address of the remap command REMAP_CMD at operation S20.

Whether the value of the remap count RM_CNT<x> of the physical address PAR<x> exceeds a first threshold count A is detected at operation S30.

In the case where the value of the remap count RM_CNT<x> of the physical address PAR<x> is detected as not exceeding the first threshold count A at the operation S30 (No), a separate additional operation is not performed.

In the case where the value of the remap count RM_CNT<x> of the physical address PAR<x> is detected to exceed the first threshold count A at the operation S30 (Yes), the controller 130 checks whether the physical address PAR<x> has been already classified as the specific physical address PAS<y> at operation S40.

In the case where, at the operation S40, the physical address PAR<x> is detected to have been already classified as the specific physical address PAS<y> (Yes), a separate additional operation is not performed. The case where, at the operation 540, the physical address PAR<x> is detected to have been already classified as the specific physical address PAS<y> (Yes) corresponds to a case where the physical address PAR<x> corresponding to the remap command REMAP_CMD at the operation S10 has been classified beforehand as the specific physical address PAS<y> through an operation S50 to be described below. Therefore, in the case where, at the operation S40, the physical address PAR<x> is detected to have been already classified as the specific physic& address PAS<y> (Yes), the operation S50 and an operation S60 to be described below should not be performed.

In the case where, at the operation S40, the physical address PAR<x> is detected as not having been already classified as the specific physical address PAS<y> (No), the physical address PAR<x> is classified as the specific physical address PAS<y>, and the data stored in the specific page SPG<y> corresponding to the specific physical address PAS<y> is classified as cold data at operation S50.

After classifying the data stored in the specific page SPG<y> as cold data at the operation 550, the remap count RM_CNT<x> of the physical address PAR<x> corresponding to the remap command REMAP_CMD is initialized at operation 560.

Referring to FIGS. 8A and 8B, the flow charts show the operation of not classifying the physical address PAR<x> to the specific physical address PAS<y> in response to the write command WRITE_CMD in the operation of the memory system 110 in accordance with an embodiment of the present disclosure described above with reference to FIGS. 5, 6A and 6B. Referring to FIG. 8A, a flow chart corresponding to the operation 5026A described above with reference to FIG. 5 is disclosed. Also, referring to FIG. 8B, a flow chart corresponding to the operation 5026B described above with reference to FIG. 5 is disclosed.

In detail, referring to FIG. 8A, if a write command WRITE_CMD and a write logical address LAW corresponding thereto are applied from the host 102, the controller 130 detects a first physical address PAW1 mapped to the write logical address LAW through mapping information, and then remaps the detected first physical address PAW1 to a second physical address PAW2 at operation S70. That is to say, the controller 130 detects the first physical address PAW1 which is being mapped to the write logical address LAW, and then detects the second physical address PAW2 which is to be remapped to the write logical address LAW.

Whether the first physical address PAW1 has been classified as the specific physical address PAS<y> is detected at operation S80.

In the case where, at the operation S80, the first physical address PAW1 is detected as the specific physical address PAS<y> (Yes), the second physical address PAW2 is not classified as the specific physical address PAS<y> at operation S90.

In the case where, at the operation S80, the first physical address PAW1 is not detected as the specific physical address PAS<y> (No), a separate additional operation is not performed.

Referring to FIG. 8B, an operation S71 and an operation S81 are the same as the operation 570 and the operation S80 described above with reference to FIG. 8A.

In detail, referring to FIG. 8B, if a write command WRITE_CMD and a write logical address LAW corresponding thereto are applied from the host 102, the controller 130 detects a first physical address PAW1 mapped to the write logical address LAW through mapping information, and then remaps the detected first physical address PAW1 to a second physical address PAW2 at operation S71. That is to say, the controller 130 detects the first physical address PAW1 which is being mapped to the write logical address LAW, and then detects the second physical address PAW2 which is to be remapped to the write logical address LAW.

Whether the first physical address PAW1 has been classified as the specific physical address PAS<y> is detected at operation S81

In the case where, at the operation S81, the first physical address PAW1 is not detected as the specific physical address PAS<y> (No), a separate additional operation is not performed.

In the case where, at the operation S81, the first physical address PAW1 is detected as the specific physical address PAS<y> (Yes), the value of a remap count RM_CNT<x> corresponding to the first physical address PAW1 is reduced, and the reduced value is assigned to the value of a remap count RM_CNT<x> of the second physical address PAW2 at the operation S71 at operation S85.

Then, whether the assigned value of the remap count RM_CNT<x> of the second physical address PAW2 is less than a second threshold count B is checked at operation S86.

In the case where, at the operation S86, the assigned value of the remap count RM_CNT<x> is determined as less than the second threshold count (Yes), the second physical address PAW2 is not classified as the specific physical address PAS<y> at operation S91.

In the case where, at the operation S86, the value of the remap count RM_CNT<x> is determined as equal to or greater than the second threshold count (No), the second physical address PAW2 is classified as the specific physical address PAS<y>, and accordingly, data (i.e., the write data WRITE_DATA) stored in the specific page SPG<y> corresponding to the second physical address PAW2 is classified as cold data at operation S87.

Now, detailed description will be made, with reference to FIGS. 9 to 17, of a data processing system and electronic appliances to which the memory system 110 including the memory device 150 and the controller 130 described above with reference to FIGS. 1 to 8B may be applied.

FIGS. 9 to 17 are diagrams schematically illustrating application examples of the data processing system of FIG. 1.

Figure 9:
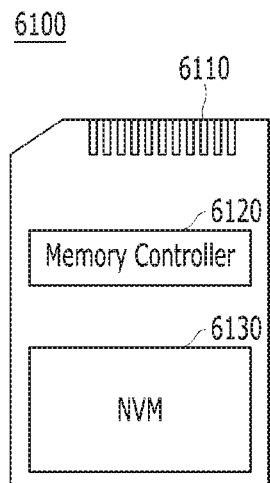
FIGS. 9 to 17 are diagrams schematically illustrating application examples of the data processing system shown in FIG. 1 in accordance with various embodiments of the present invention.

FIG. 9 is a diagram schematically illustrating another example of the data processing system including the memory system in accordance with an embodiment. FIG. 9 schematically illustrates a memory card system to which the memory system is applied.

Referring to FIG. 9, the memory card system 6100 may include a memory controller 6120, a memory device 6130 and a connector 6110.

More specifically, the memory controller 6120 may be connected to the memory device 6130 embodied by a nonvolatile memory, and configured to access the memory device 6130. For example, the memory controller 6120 may be configured to control read, write, erase and background operations of the memory device 6130. The memory controller 6120 may be configured to provide an interface between the memory device 6130 and a host, and drive firmware for controlling the memory device 6130. That is, the memory controller 6120 may correspond to the controller 130 of the memory system 110 described with reference to FIGS. 1 and 5, and the memory device 6130 may correspond to the memory device 150 of the memory system 110 described with reference to FIGS. 1 and 5.

Thus, the memory controller 6120 may include a RAM, a processor, a host interface, a memory interface and an error correction component. The memory controller 130 may further include the elements shown in FIG. 5.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system may be applied to wired/wireless electronic devices, particularly mobile electronic devices.

The memory device 6130 may be implemented by a nonvolatile memory. For example, the memory device 6130 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM). The memory device 6130 may include a plurality of dies as in the memory device 150 of FIG. 5.

The memory controller 6120 and the memory device 6130 may be integrated into a single semiconductor device. For example, the memory controller 6120 and the memory device 6130 may construct a solid state driver (SSD) by being integrated into a single semiconductor device. Also, the memory controller 6120 and the memory device 6130 may construct a memory card such as a PC card (PCMCIA: Personal Computer Memory Card International Association), a compact flash (CF) card, a smart media card (e.g., SM and SMC), a memory stick, a multimedia card (e.g., MMC, RS-MMC, MMCmicro and eMMC), an SD card (e.g., SD, miniSD, microSD and SDHC) and a universal flash storage (UFS).

Figure 10:
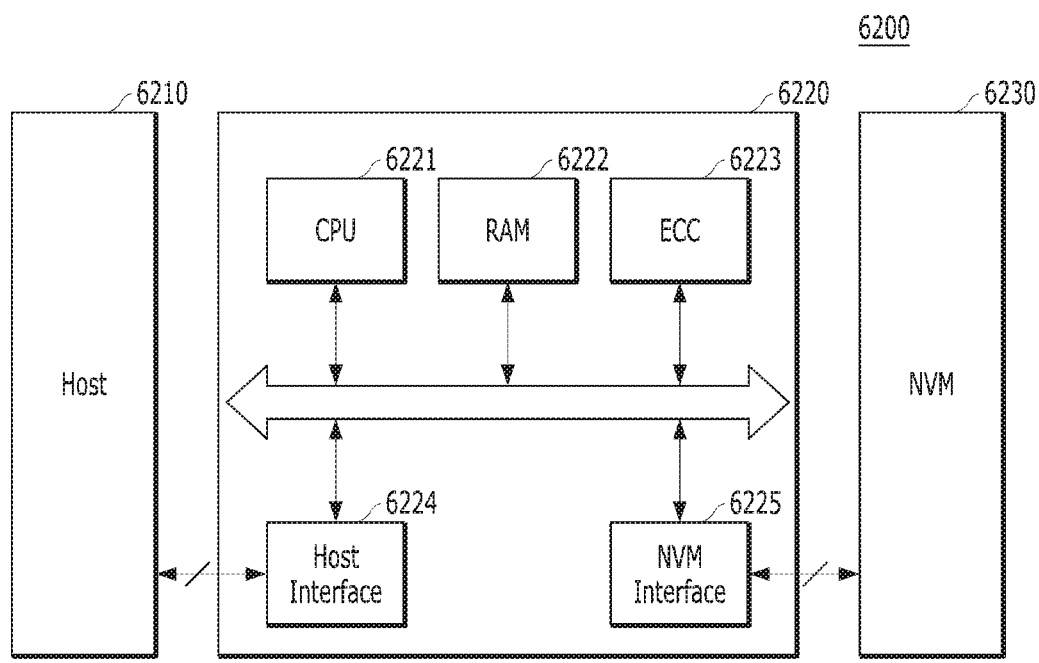

FIG. 10 is a diagram schematically illustrating another example of the data processing system including the memory system in accordance with an embodiment.

Referring to FIG. 10, the data processing system 6200 may include a memory device 6230 having one or more nonvolatile memories and a memory controller 6220 for controlling the memory device 6230. The data processing system 6200 illustrated in FIG. 10 may serve as a storage medium such as a memory card (CF, SD, micro-SD or the like) or USB device, as described with reference to FIG. 1. The memory device 6230 may correspond to the memory device 150 in the memory system 110 illustrated in FIGS. 1 and 5, and the memory controller 6220 may correspond to the controller 130 in the memory system 110 illustrated in FIGS. 1 and 5.

The memory controller 6220 may control a read, write or erase operation on the memory device 6230 in response to a request of the host 6210, and the memory controller 6220 may include one or more CPUs 6221, a buffer memory such as RAM 6222, an ECC circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the memory device 6230 to operate at high speed.

The ECC circuit 6223 may correspond to the ECC component 138 of the controller 130 illustrated in FIG. 1. As described with reference to FIG. 1, the ECC circuit 6223 may generate an ECC (Error Correction Code) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. The ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may exchange data with the host 6210 through the host interface 6224, and exchange data with the memory device 6230 through the NVM interface 6225. The host interface 6224 may be connected to the host 6210 through a PATA bus, SATA bus, SCSI, USB, PCIe or NAND interface. The memory controller 6220 may have a wireless communication function with a mobile communication protocol such as WiFi or Long Term Evolution (LTE). The memory controller 6220 may be connected to an external device, for example, the host 6210 or another external device, and then transmit/receive data to/from the external device. In particular, as the memory controller 6220 is configured to communicate with the external device through one or more of various communication protocols, the memory system and the data processing system may be applied to wired/wireless electronic devices, particularly a mobile electronic device.

Figure 11:
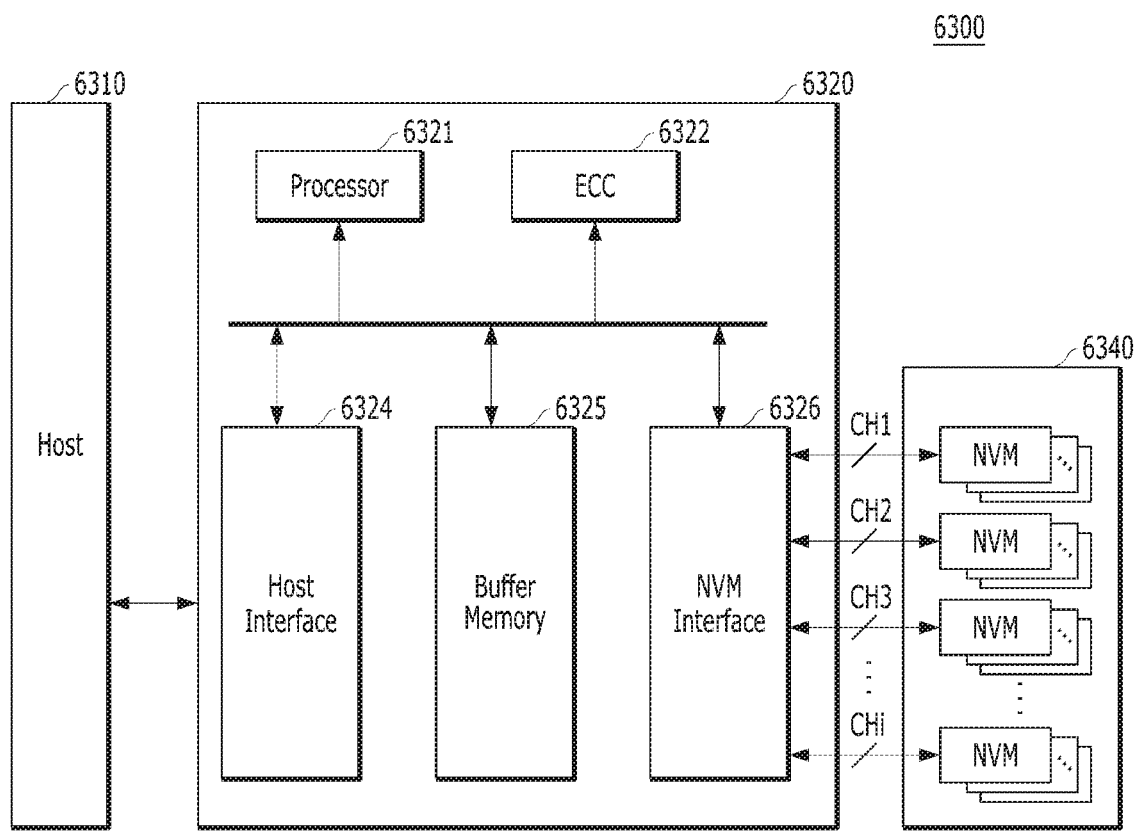

FIG. 11 is a diagram schematically illustrating another example of the data processing system including the memory system in accordance with an embodiment. FIG. 11 schematically illustrates an SSD to which the memory system is applied.

Referring to FIG. 11, the SSD 6300 may include a controller 6320 and a memory device 6340 including a plurality of nonvolatile memories. The controller 6320 may correspond to the controller 130 in the memory system 110 of FIGS. 1 and 5, and the memory device 6340 may correspond to the memory device 150 in the memory system of FIGS. 1 and 5.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as DRAM, SDRAM, DDR SDRAM, LPDDR SDRAM and GRAM or nonvolatile memories such as FRAM, ReRAM, STT-MRAM and PRAM. FIG. 10 illustrates that the buffer memory 6325 exists in the controller 6320. However, the buffer memory 6325 may be disposed externally to the controller 6320.

The ECC circuit 6322 may calculate an ECC value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIGS. 1 and 5 is applied may be provided to embody a data processing system, for example, RAID (Redundant Array of Independent Disks) system. The RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 12:
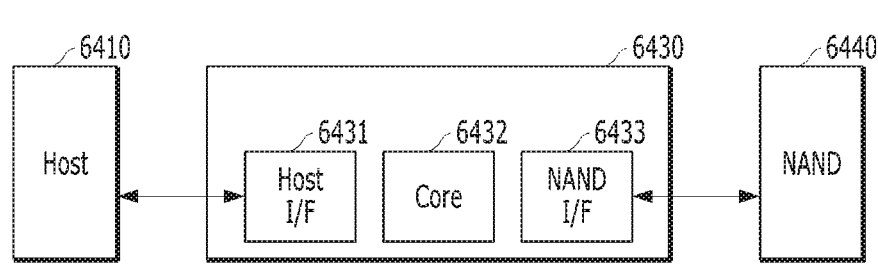

FIG. 12 is a diagram schematically illustrating another example of the data processing system including the memory system in accordance with an embodiment. FIG. 12 schematically illustrates an embedded Multi-Media Card (eMMC) to which the memory system is applied.

Referring to FIG. 12, the eMMC 6400 may include a controller 6430 and a memory device 6440 embodied by one or more NAND flash memories. The controller 6430 may correspond to the controller 130 in the memory system 110 of FIGS. 1 and 5, and the memory device 6440 may correspond to the memory device 150 in the memory system 110 of FIGS. 1 and 5.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 13 to 16 are diagrams schematically illustrating other examples of the data processing system including the memory system in accordance with other embodiments. FIGS. 13 to 16 schematically illustrate UFS (Universal Flash Storage) systems to which the memory system is applied.

Referring to FIGS. 13 to 16, the UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The hosts 6510, 6610, 6710 and 6810 may serve as application processors of wired/wireless electronic devices or particularly mobile electronic devices, the UFS devices 6520, 6620, 6720 and 6820 may serve as embedded UFS devices, and the UFS cards 6530, 6630, 6730 and 6830 may serve as external embedded UFS devices or removable UFS cards.

The hosts 6510, 6610, 6710 and 6810, the UFS devices 6520, 6620, 6720 and 6820 and the UFS cards 6530, 6630, 6730 and 6830 in the respective UFS systems 6500, 6600, 6700 and 6800 may communicate with external devices, for example, wired/wireless electronic devices or particularly mobile electronic devices through UFS protocols, and the UFS devices 6520, 6620, 6720 and 6820 and the UFS cards 6530, 6630, 6730 and 6830 may be embodied by the memory system 110 illustrated in FIGS. 1 and 5. For example, in the UFS systems 6500, 6600, 6700 and 6800, the UFS devices 6520, 6620, 6720 and 6820 may be embodied in the form of the data processing system 6200, the SSD 6300 or the eMMC 6400 described with reference to FIGS. 10 to 12, and the UFS cards 6530, 6630, 6730 and 6830 may be embodied in the form of the memory card system 6100 described with reference to FIG. 9.

Furthermore, in the UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720 and 6820 and the UFS cards 6530, 6630, 6730 and 6830 may communicate with each other through various protocols other than the UFS protocol, for example, UFDs, MMC, SD, mini-SD, and micro-SD.

Figure 13:
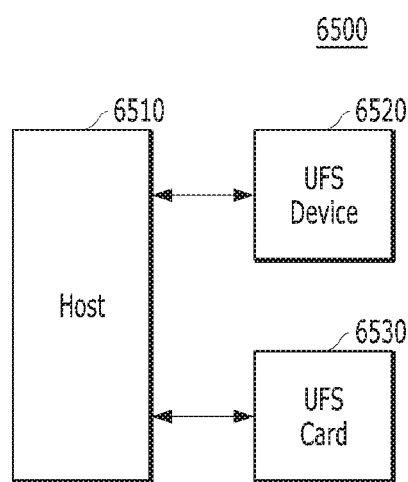

In the UFS system 6500 illustrated in FIG. 13, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. The UFS device 6520 and the UFS card 6530 may communicate with each other through link layer switching at the UniPro of the host 6510. In the embodiment of FIG. 13, the configuration in which one UFS device 6520 and one UFS card 6530 are connected to the host 6510 is illustrated by way of example. However, in another embodiment a plurality of UFS devices and UFS cards may be connected in parallel or in the form of a star to the host 6410, and a plurality of UFS cards may be connected in parallel or in the form of a star to the UFS device 6520 or connected in series or in the form of a chain to the UFS device 6520.

Figure 14:
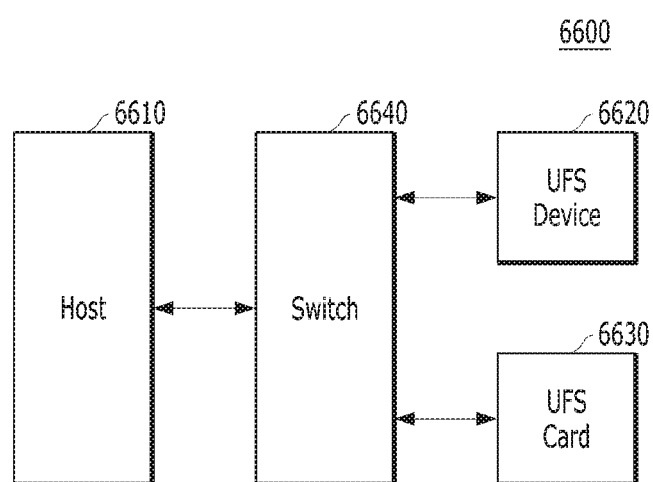

In the UFS system 6600 illustrated in FIG. 14, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the embodiment of FIG. 14, the configuration in which one UFS device 6620 and one UFS card 6630 are connected to the switching module 6640 is illustrated by way of example. However, in another embodiment, a plurality of UFS devices and UFS cards may be connected in parallel or in the form of a star to the switching module 6640, and a plurality of UFS cards may be connected in series or in the form of a chain to the UFS device 6620.

Figure 15:
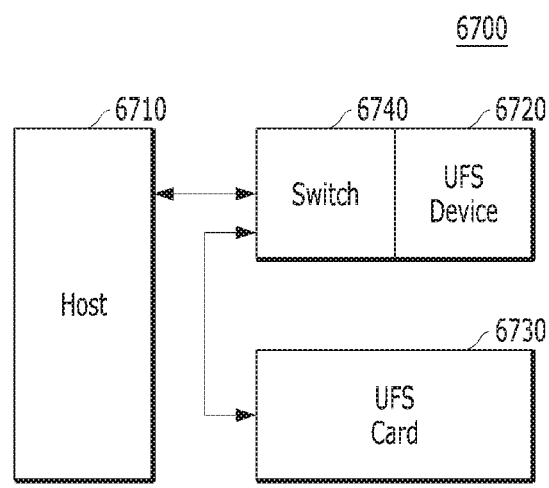

In the UFS system 6700 illustrated in FIG. 15, each of the host 6710, the UFS device 6720 and the UFS card 6730 may include UniPro, and the host 6710 may communicate with the UFS device 6720 or the UFS card 6730 through a switching module 6740 performing a switching operation, for example, through the switching module 6740 which performs link layer switching at the UniPro, for example, L3 switching. The UFS device 6720 and the UFS card 6730 may communicate with each other through link layer switching of the switching module 6740 at the UniPro, and the switching module 6740 may be integrated as one module with the UFS device 6720 within or externally to the UFS device 6720. In the embodiment of FIG. 15, the configuration in which one UFS device 6720 and one UFS card 6730 are connected to the switching module 6740 is illustrated by way of example. However, in another embodiment, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 16:
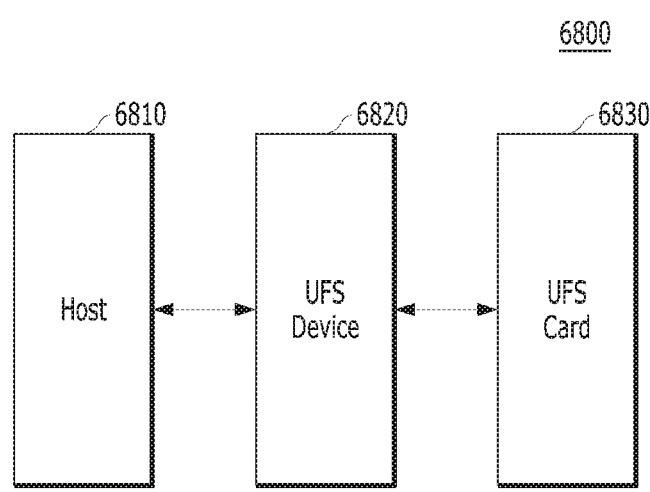

In the UFS system 6800 illustrated in FIG. 16, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. The host 6810 and the UFS card 6830 may communicate with each other through target ID switching between the M-PHY and UniPro modules of the UFS device 6820. In the embodiment of FIG. 16, the configuration in which one UFS device 6820 is connected to the host 6810 and one UFS card 6830 is connected to the UFS device 6820 is illustrated by way of example. However, in another embodiment, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 17:
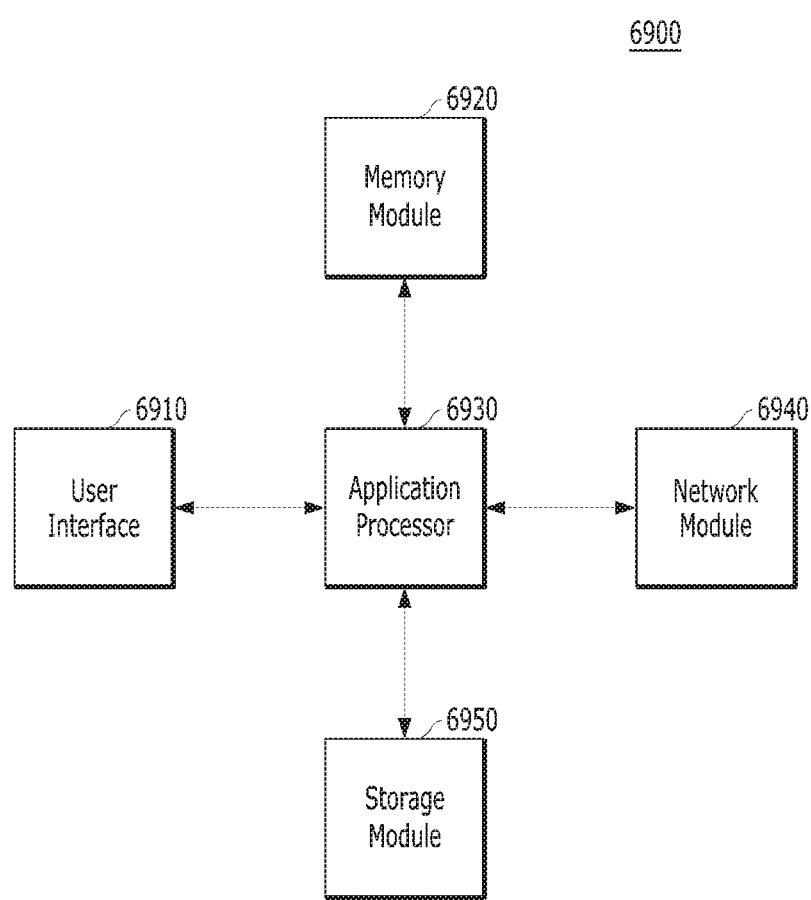

FIG. 17 is a diagram schematically illustrating another example of the data processing system including the memory system in accordance with an embodiment. FIG. 17 is a diagram schematically illustrating a user system to which the memory system is applied.

Referring to FIG. 17, the user system 6900 may include an application processor 6930, a memory module 6920, a network module 6940, a storage module 6950 and a user interface 6910.

More specifically, the application processor 6930 may drive components included in the user system 6900, for example, an OS, and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile RAM such as DRAM, SDRAM, DDR SDRAM, DDR2 SDRAM, DDR3 SDRAM, LPDDR SDARM, LPDDR3 SDRAM or LPDDR3 SDRAM or a nonvolatile RAM such as PRAM, ReRAM, MRAM or FRAM. For example, the application processor 6930 and the memory module 6920 may be packaged and mounted, based on POP (Package on Package).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIGS. 1 and 5. Furthermore, the storage module 6950 may be embodied as an SSD, eMMC and UFS as described above with reference to FIGS. 11 to 16.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIGS. 1 and 5 is applied to a mobile electronic device of the user system 6900, the application processor 6930 may control overall operations of the mobile electronic device, and the network module 6940 may serve as a communication module for controlling wired/wireless communication with an external device. The user interface 6910 may display data processed by the processor 6930 on a display/touch module of the mobile electronic device, or support a function of receiving data from the touch panel.

in embodiments of the present disclosure, data for which remap commands from a host are generated by exceeding a first threshold count is managed by being classified as cold data. Through this, it is possible to effectively classify the data stored in a memory system.

Although various embodiments have been illustrated and described, it will be apparent to those skilled in the art in light of the present disclosure that various changes and modifications may be made without departing from the spirit and scope of the invention as defined in the following claims.

What is claimed is:

1. A memory system comprising:
   a nonvolatile memory device including a plurality of memory blocks each including a plurality of pages; and
   a controller suitable for:
   managing mapping information for mapping logical addresses used in a host to physical addresses corresponding to pages;
   classifying, as a specific physical address, a physical address that becomes a target physical address of a remap command from the host by exceeding a first threshold count; and
   classifying, as cold data, data stored in a specific page corresponding to the specific physical address among the pages,
   wherein, when a first logical address and a second logical address in correspondence to the remap command are inputted from the host, the controller further:
   detects the target physical address corresponding to the first logical address through the mapping information; and
   remaps the target physical address to the second logical address,
   wherein, after remapping the detected physical address to the second logical address, the controller further increases a remap count of the target physical address, and
   wherein the first threshold count is a natural number of 2 or more.

2. The memory system according to claim 1,
   wherein, after increasing the remap count of the target physical address, the controller further detects whether the remap count of the target physical address exceeds the first threshold count, and
   wherein the controller classifies the target physical address as the specific physical address when the remap count exceeds the first threshold count.

3. The memory system according to claim 2, wherein the controller further initializes the remap count of the specific physical address according to the classification of the data.

4. The memory system according to claim 3, wherein the controller further increases the remap count of the specific physical address whenever the specific physical address becomes the target physical address.

5. The memory system according to claim 4,
   wherein, in response to a write command provided along with a write logical address and write data, the controller further:
   detects a first physical address mapped to the write logical address in the mapping information;
   remaps a second physical address to the write logical address; and
   stores the write data in a page corresponding to the second physical address among the pages,
   wherein the controller does not classify the second physical address as the specific physical address when the first physical address has been classified as the specific physical address.

6. The memory system according to claim 4,
   wherein, in response to a write command provided along with a write logical address and write data, the controller further:
   detects a first physical address mapped to the write logical address in the mapping information;
   remaps a second physical address to the write logical address; and
   stores the write data in a page corresponding to the second physical address among the pages,
   wherein, when the first physical address has been classified as the specific physical address, the controller further reduces the remap count of the first physical address and assigns the reduced value to the remap count of the second physical address.

7. The memory system according to claim 6,
   wherein the controller further:
   checks whether the remap count of the second physical address is less than a second threshold count; and
   does not classify the second physical address as the specific physical address when the remap count of the second physical address is less than the second threshold count, and
   wherein the second threshold count is set to a natural number which is less than or equal to the first threshold count.

8. The memory system according to claim 1, wherein, in the case where the number of specific pages in which cold data are stored, among entire pages included in the memory blocks, reaches a set number, the controller further:
   moves the cold data to a specific memory block among the memory blocks through a merge operation; and
   manages the specific memory block as a cold block.

9. The memory system according to claim 1, wherein the controller further:
   selects a memory block in which the number of invalid pages exceeds a set percentage among the memory blocks;
   moves data classified as cold data among data stored in valid pages of the selected memory block, to a first memory block among the memory blocks through a merge operation;
   moves data not classified as cold data to a second memory block among the memory blocks through the merge operation;
   manages the first memory block as a cold block; and
   manages the second memory block as a normal block or a hot block.

10. A method for operating a memory system including a nonvolatile memory device which includes a plurality of memory blocks each including a plurality of pages, the method comprising:
    managing mapping information for mapping logical addresses used in a host to physical addresses corresponding to pages;
    classifying, as a specific physical address, a physical address which becomes a target physical address of a remap command from the host by exceeding a first threshold count among the physical addresses; and
    classifying, as cold data, data stored in a specific page corresponding to the specific physical address among the pages;
    when a first logical address and a second logical address in correspondence to the remap command are inputted from the host, the method further comprising:
    detecting the target physical address corresponding to the first logical address through the mapping information;
    remapping the target physical address to the second logical address; and
    increasing, after the remapping of the target physical address, a remap count of the target physical address,
    wherein the first threshold count is a natural number of 2 or more.

11. The method according to claim 10, further comprising detecting, after the increasing of the remap count, whether the remap count of the target physical address exceeds the first threshold count;
   wherein the target physical address is classified as the specific physical address in the case where the remap count exceeds the first threshold count.

12. The method according to claim 11, further comprising initializing the remap count of the specific physical address according to the classifying of the data.

13. The method according to claim 12, further comprising increasing the remap count of the specific physical address whenever the specific physical address becomes the target physical address.

14. The method according to claim 13, further comprising in response to a write command provided along with a write logical address and write data:
   detecting a first physical address mapped to the write logical address in the mapping information;
   remapping a second physical address to the write logical address; and
   storing the write data in a page corresponding to the second physical address among the pages,
   wherein the second physical address is not classified as the specific physical address when the first physical address has been classified as the specific physical address.

15. The method according to claim 13, further comprising in response to a write command provided along with a write logical address and write data:
   detecting a first physical address mapped to the write logical address in the mapping information;
   remapping a second physical address to the write logical address; and
   storing the write data in a page corresponding to the second physical address among the pages; and
   further comprising when the first physical address has been classified as the specific physical address:
      reducing the remap count of the first physical address; and
      assigning the reduced value to the remap count of the second physical address.

16. The method according to claim 15, further comprising:
   checking whether the remap count of the second physical address is less than a second threshold count; and
   not classifying the second physical address as the specific physical address when the remap count of the second physical address is less than the second threshold count,
   wherein the second threshold count is set to a natural number which is less than or equal to the first threshold count.

17. The method according to claim 10, further comprising in the case where the number of specific pages in which cold data are stored reaches a set number among entire pages in the memory blocks:
   moving the cold data to a specific memory block among the memory blocks through a merge operation; and
   managing the specific memory block as a cold block.

18. The method according to claim 10, further comprising:
   selecting a memory block in which the number of invalid pages exceeds a set percentage among the memory blocks;
   moving data classified as cold data among data stored in valid pages of the selected memory block, to a first memory block among the memory blocks through a merge operation;
   moving data not classified as cold data to a second memory block among the memory blocks through the merge operation;
   managing the first memory block as a cold block; and
   managing the second memory block as a normal block or a hot block.

* * * * *